July 31, 1956  D. D. KLOSS  2,756,855
HELICAL SPRING FRICTION CLUTCH
Filed Jan. 21, 1955  2 Sheets-Sheet 1
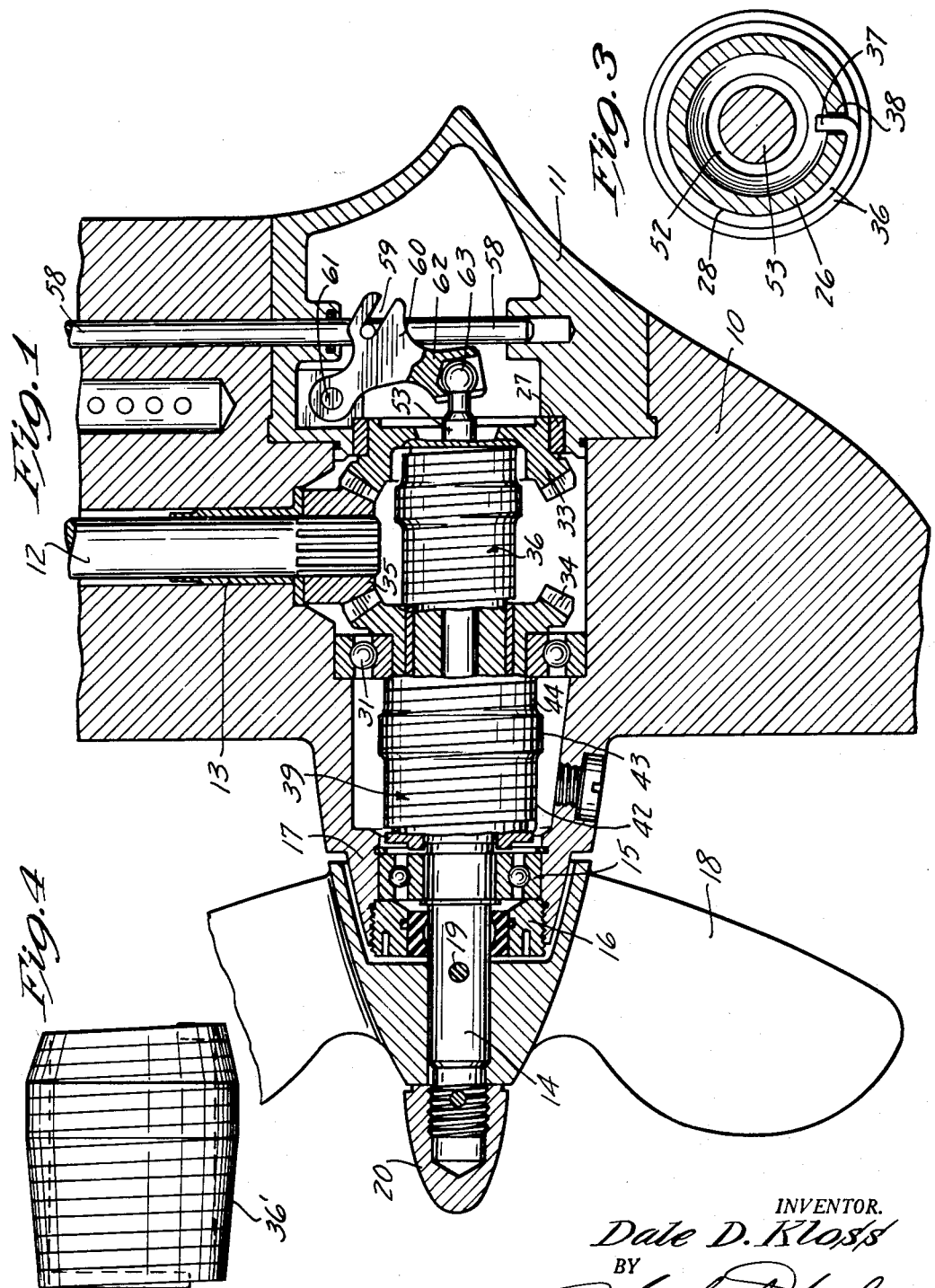
INVENTOR.
Dale D. Kloss
BY
Merchant & Merchant
ATTORNEYS

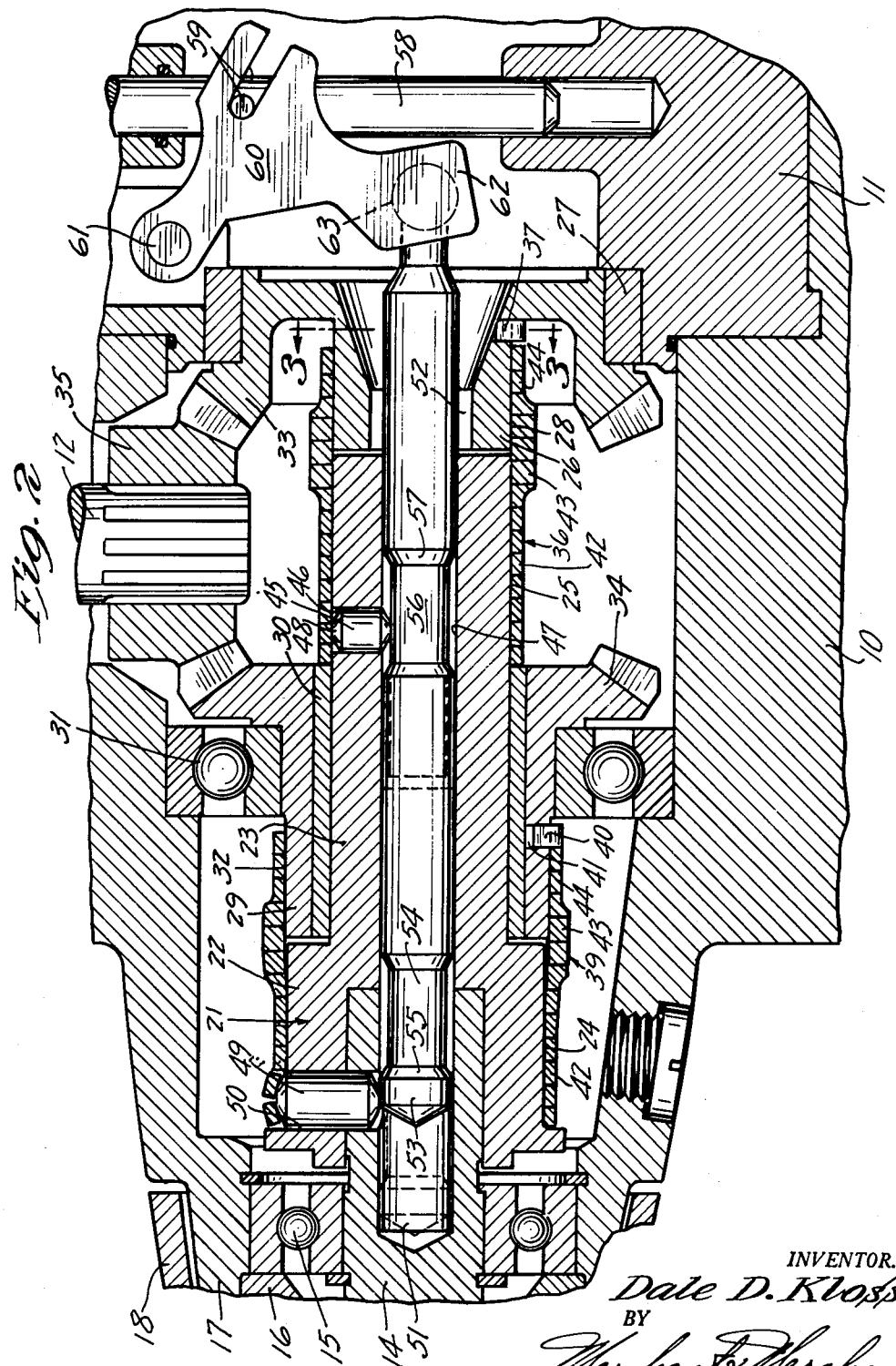

United States Patent Office 2,756,855
Patented July 31, 1956

2,756,855

HELICAL SPRING FRICTION CLUTCH

Dale D. Kloss, Minneapolis, Minn., assignor to Champion Motors Company, Minneapolis, Minn., a corporation of Minnesota Application January 21, 1955, Serial No. 483,319

7 Claims. (Cl. 192—41)

My invention relates generally to clutch mechanisms, and more particularly to clutches of the type involving helically-wound clutch-acting springs which engage external cylindrical surfaces of driving and driven members to couple the same together in driving engagement.

The present invention is an improvement over my now pending application, S. N. 268,430, filed on January 26, 1952, for a "Helical Spring Friction Clutch," now Patent No. 2,705,065 dated March 29, 1955, and in particular, provides an improved construction which will give longer trouble-free service.

I provide an improved clutch mechanism which includes axially aligned driving and driven shafts having external cylindrical wall surfaces encompassed by a helically-wound clutch spring which is radially movable between a driving position, wherein it grips the underlying external surfaces of both shaft elements to effect driving engagement therebetween, and a released non-driving position; it is an important object of my invention that the spring is formed so as to provide more strength at and close to the dividing line between the shaft elements where the maximum stresses are applied but without sacrificing either the requisite resiliency for proper operation of the spring or the clutching force of the spring.

It is a further object of my invention to provide that said helically-wound clutch spring is formed with the convolutions of an intermediate portion thereof having greater radial cross section dimensions than the convolutions of the end portions of the spring on opposite sides of said intermediate portion, whereby the clutch spring is thickened and strengthened without changing the width of adjacent convolutions which are substantially constant from end to end.

Other objects and advantages of my invention will become apparent from the following specification and claims, reference being had to the accompanying drawings wherein:

Fig. 1 is a fragmentary view, partly in vertical section and partly in side elevation, showing my invention as applied to the clutch mechanism of an outboard motor;

Fig. 2 is an enlarged fragmentary view in vertical section of a portion of the structure shown in Fig. 1;

Fig. 3 is a view in vertical section taken substantially on the line 3—3 of Fig. 2; and Fig. 4 is a view in side elevation showing a modification of the helical clutch spring shown in Figs. 1–3.

Referring more particularly to the drawings, wherein like parts are indicated by the same numeral, the numeral 10 indicates the propeller shaft housing of an outboard motor having a removable housing section 11. A generally vertically disposed drive shaft 12 has its lower end portion journalled in a bearing 13 in the propeller shaft housing 10. A propeller shaft section 14 is mounted in an anti-friction bearing 15 anchored in place by a packing gland-equipped retaining nut 16 which is screw threaded into a rear end portion 17 of the propeller shaft housing 10. A propeller 18 is mounted on propeller shaft section 14 and is held against rotation with respect thereto by a conventional shear pin 19 and against axial movement on the shaft section 14 by the usual retaining nut 20.

I provide a drive train between drive shaft 12 and propeller shaft 14 comprising my novel and improved clutch mechanism. A driven rotary shaft element 21 is secured to propeller shaft section 14 for common rotation therewith by conventional key or spline means, not specifically shown. Shaft element 21 comprises a diametrically enlarged portion 22 disposed adjacent its rearward end and a reduced portion 23 extending axially between the enlarged portion 22 and the forward end of shaft element 21. Shaft portions 22 and 23 have cylindrical external wall surfaces 24 and 25, respectively. A driving shaft element 26 is journalled adjacent the forward end of driven shaft element 21 in axial alignment by sleeve bearing 27 mounted in the removable housing section 11. Driving shaft element 26 has a cylindrical external wall surface 28 of substantially the same diameter as wall surface 25. A second driving rotary shaft element 29 is journalled, by means of a sleeve bearing or the like 30, to the reduced portion 23 of driven shaft element 21 adjacent the enlarged portion 22 thereof. An anti-friction bearing 31 embraces driving shaft element 29 to support it and the driven shaft element 21 in the propeller shaft housing 10 in axial alignment with driving shaft element 26. Driving shaft element 29 has an external cylindrical wall surface 32 disposed adjacent to and of substantially the same diameter as wall surface 24 of driven shaft element 21. Beveled gears 33 and 34 are preferably formed integrally with driving shaft elements 26 and 29 respectively and are meshed with a bevel gear 35, which is splined or otherwise rigidly secured to the lower end of drive shaft 12, whereby to be rotated simultaneously in opposite directions by drive shaft 12. It will be noted that driving shaft elements 26 and 29, which are driven simultaneously in opposite directions responsive to one direction of rotation of shaft 12, are normally free to rotate independently of the driven shaft element 21, which is connected to the propeller shaft section 14 for movement therewith.

I provide a helically-wound clutch-acting spring 36 which encompasses the cylindrical external wall surfaces 25 and 28 of driven shaft element 21 and driving shaft element 26, respectively. Referring in particular to Fig. 3, spring 36 is provided at one end with a radially inwardly projecting ear 37 which is received within a recess or pocket 38 in the driving shaft element 26 adjacent the gear 33. This preferred arrangement provides a positive anchoring of the clutch spring 36 to the driving shaft element 26. Clutch spring 36 may be anchored to driving shaft element 26 in any other suitable manner; and for example, it may be formed of a size relative to shaft element 26 so as to be frictionally anchored thereon. Clutch spring 36 preferably normally encompasses the underlying wall surface 25 of the driven shaft element 21 sufficiently loosely to normally permit free rotation of the driven shaft element 21 with respect thereto; and preferably, I provide means, subsequently disclosed in detail, for radially contracting sufficient of the coils of clutch spring 36 overlying wall surface 25 of driven shaft element 21 to cause driving engagement therebetween. Conceivably, within the scope of the invention herein disclosed, clutch spring 36 could normally be of a size relative to the driven shaft element 21 so as to frictionally encompass the external underlying wall surface 25 in driving engagement and means could be provided to selectively radially expand the clutch spring 36 to permit free rotation of the driven shaft element 21 with respect thereto.

I further provide a second helically-wound clutch-acting spring 39 which encompasses cylindrical external wall surfaces 24 and 32 of driven shaft element 21 and driving shaft element 29, respectively. Clutch spring 39 is anchored to driving shaft element 29 in the same manner as clutch spring 36 is anchored to driving shaft element 26, wherein a radially inwardly projecting ear 40 of clutch spring 39 is received within a recess or pocket 41 in driving shaft element 29. Clutch spring 39 encompasses the underlying wall surface 24 of enlarged portion 22 of driven shaft element 21 sufficiently loosely to normally permit free rotation of the driven shaft element 21 with respect thereto.

Clutch springs 36 and 39 are formed so as to provide more strength where the maximum stresses are applied to prevent breakage of the clutch springs and provide for longer trouble-free service. It has been found that this cannot be accomplished by merely uniformly providing the clutch springs of greater cross sectional dimensions without sacrificing proper operation of the clutch mechanisms. Therefore, I have provided the coils of an end portion 42 of clutch spring 36, overlying wall surface 25 axially rearwardly of the forward end of reduced portion 23, and the coils of an end portion 42 of clutch spring 39, overlying wall surface 24 axially rearwardly of the forward end of enlarged portion 22, both of reduced radial cross sectional dimensions. In the preferred commercial embodiment of my invention each of the clutch springs 36 and 39 is formed with an intermediate portion 43 of approximately three full convolutions or coils of uniformly greater radial cross sectional dimensions than the coils on opposite sides thereof, end portion 42 and an end portion 44, which are, as shown in Figs. 1 and 2, of uniformly reduced radial cross sectional dimensions. Preferably, springs 36 and 39 are originally of uniform cross sectional dimensions, which are the dimensions of the intermediate portions 43 thereof; and they are formed as shown in Figs. 1 and 2, by grinding their outer surfaces at both end portions 42 and 44 to the desired uniformly reduced cross sectional dimensions.

The intermediate portion 43 of clutch spring 36 is positioned to overlie adjacent end portions of wall surfaces 25 and 28 or to overlie the dividing line between driving shaft element 26 and driven shaft element 21 to dispose the greater cross sectional dimensions of spring 36 at the place where the maximum stresses are applied. I provide approximately three full convolutions or coils of greater cross sectional dimensions at the dividing line between shaft elements 26 and 21 to insure one maximum convolution or coil at the precise dividing line where a coil of reduced cross sectional dimension would be likely to break. Similarly, the intermediate portion 43 of clutch spring 39, of approximately three convolutions or coils of greater cross sectional dimensions, is disposed at and adjacent the dividing line between driving shaft element 29 and driven shaft element 21 to insure one convolution or coil of maximum cross sectional dimension at the division line between shaft elements 29 and 21, where the greater stresses are applied and a spring of reduced cross sectional dimension would be likely to break.

A particular advantage in strengthening the intermediate portion 43 of each of the clutch springs 36 and 39, as particularly specified, that is, by providing the convolutions thereof with greater radial cross sectional dimensions than the convolutions of end portions 42 and 44, is that clutch springs 36 and 39 are thickened and strengthened without changing the width of adjacent convolutions of each of the springs, which widths are substantially constant from end to end. Thus, I do not decrease the number of convolutions for any desired length of the springs, and thereby do not sacrifice any of the clutching force of the springs. The greater the number of convolutions for any desired length of a clutch spring, the greater the gripping or clutching force thereof. Because clutch mechanisms of the type herein disclosed are used in a limited space, it is particularly important that I have thickened and strengthened intermediate portion 43 of each of the springs 36 and 39 without affecting the number of convolutions, and thereby without decreasing or sacrificing any of the clutching force thereof.

For the purpose of radially contracting sufficient of the convolutions or coils of the spring 36 overlying the cylindrical external wall surface 25 of reduced portion 23 of driven shaft element 21 to cause driving engagement therebetween, I provide a movable member in the nature of a pin or the like 45 which is axially movable in a passage 46 which extends radially inwardly from the wall surface 25 of shaft element 21 and communicates at its inner end with an axially extended passage 47 in the driven shaft element 21. Radially outer end of the pin 45 is preferably rounded, as indicated at 48, and engages a portion of one or more convolutions or coils of the reduced portion 42 of the clutch spring 36 upon radially outward movement and moves said portion or portions radially outwardly from the underlying wall surface 25 of the driven shaft element 21. This movement causes the remaining portions of the said convolution or convolutions and adjacent convolutions to contract radially against and grip the underlying outer cylindrical wall surface 25 whereby to impart rotary movement to the driven shaft 21 in the same direction as that of the driving shaft element 26. Clutch spring 36 is wound with respect to the direction of rotation of the driving shaft element 26 so that when the convolutions or coils thereof are contracted radially, as above described, said convolutions or coils will tend to wrap themselves tightly around the driven shaft element 21 and exert sufficient friction thereagainst to effect substantially a positive drive.

I provide a similar arrangement for radially contracting sufficient of the convolutions or coils at the reduced end portion 42 of clutch spring 39 overlying the cylindrical wall surface 24 of driven shaft element 21 to cause driving engagement therebetween, wherein a movable member in the nature of a pin or the like 49 is axially movable in a passage 50 which extends radially inwardly from wall surface 25 of the enlarged portion 22 of driven shaft element 21 and communicates at its inner end with an axial passage 51 in the propeller shaft section 14. Pin 49, similar to the pin 45, has its rounded outer end engageable with a portion of one or more convolutions or coils of the reduced end portion 42 of spring 39 upon radially outward movement to move said portion or portions radially outwardly from the underlying external wall surface 24, as shown in Fig. 2. This movement causes the remaining portions of the said convolution or convolutions and adjacent convolutions or coils to contract radially against and grip the underlying wall surface 24 of enlarged portion 22 whereby to impart rotary movement of driven shaft element 21 in the same direction as that of the driving shaft element 29. Similar to spring 36, spring 39 is wound with respect to the direction of rotation of the driving shaft element 29 so that when contracted radially, said convolutions will tend to wrap themselves tightly around the driven shaft element 21 to effect substantially a positive drive between driven shaft element 21 and driving shaft element 29.

Axial passage 51 is axially aligned with and in communication with the adjacent passage 47 in the driven shaft element 21 and of substantially the same diameter. Driving shaft element 26 is provided with an axial passage 52 which is axially aligned with the passages 47 and 51; and means for selectively moving the pins 45 and 49 in radially outward directions to effect driving engagement between driven shaft element 21 and the driving shaft elements 36 and 39 comprises an actuator rod 53 which extends through the passage 52 and into the passages 47 and 51 for axially slidable movement. Actuator rod 53 is diametrically reduced adjacent its rear end, as indicated by the numeral 54, to provide a cam-acting surface 55 engageable with the rounded inner end of pin 49 to move the same radially outwardly upon axial movements of the rod 53 in one direction.

At its intermediate portion, actuator rod 53 is formed to provide a diametrically reduced portion 56 and an adjacent cam-acting surface 57 which engages the rounded inner end of the pin 45 to move the same radially outwardly into tightening engagement with the spring 36 upon axial movements of the rod 53 in one direction At the full line position of actuator rod 53 shown in Fig. 2, pin 49 has been moved radially outwardly into operative engagement with its respective clutch spring 39 and pin 45 is in its radially inward position engaging the diametrically reduced portion 56, wherein drive shaft 12 is in driving engagement with propeller shaft section 14 through driving shaft element 29 and gear 34. A relatively short axial rearward movement of rod 53, from its full line position toward its dotted line position shown in Fig. 2, will permit the pin 49 to move radially inwardly to engage the diametrically reduced portion 55 and render clutch spring 39 out of frictional engagement with enlarged portion 22 of driven shaft element 21. At this point, the pin 45 is still in its radially inward position in engagement with the diametrically reduced portion 56 whereby clutch spring 36 is also out of driving engagement with reduced portion 23 of driven shaft element 21. This position of rod 53 is a "neutral position" wherein the propeller 18 remains stationary during the rotation of drive shaft 12. Further rearward movement of actuator rod 53 to its dotted line position shown in Fig. 2 will bring the cam-acting surface 57 into engagement with the pin 45 to move the same outwardly into convolution contracting engagement with the clutch spring 36. At this last-mentioned position of rod 53, pin 49 is at its radially inward position in engagement with the diametrically reduced portion 54 whereby clutch spring 39 is out of driving engagement with driven shaft element 21; and drive shaft 12 is in driving engagement with propeller shaft section 14 through gear 33 and driving shaft element 26.

The axial movement of actuator rod 53, between its full line position and dotted line position shown in Fig. 2, is effected by axial movement of a vertically disposed control rod 58 which, adjacent its lower end, has a pin and slot connection, indicated by the numeral 59, with a bell crank 60 pivotally mounted as indicated by the numeral 61. Bell crank 60 is connected at its end 62 to the forward end of actuator rod 53 by a ball and socket connection, indicated by the numeral 63. With this arrangement, it is clear that vertical movements of control rod 58 will impart forward and rearward axial movements to the actuator rod 53 through bell crank 60 to place the clutch mechanisms herein provided into neutral, forward or reverse drive conditions.

Referring again to the form and positions of springs 36 and 39, it should be noted that intermediate portions 43 are of sufficient cross sectional dimensions to provide the necessary strength at the dividing line between cooperating driving and driven shaft elements, where the maximum stresses are applied, which insures against breakage of the springs; but the convolutions or coils of each spring are reduced in cross sectional dimensions on opposite sides of the intermediate portion 43 thereof to provide uniformly reduced end portions 42 and 44 because a spring uniformly of the dimensions of the intermediate portion 43, although strong enough to withstand the maximum stresses applied, would be too stiff and unflexible for the proper operation of the clutch mechanisms. Therefore, springs 36 and 39 are formed to have the necessary strength for long trouble-free service together with the necessary flexibility and resiliency for proper and effective operation. Although springs 36 and 39, as shown in Figs. 1 and 2, represent a preferred commercial embodiment thereof, I have shown a modification of the spring in Fig. 4, which spring is indicated by the numeral 36'; wherein, spring 36' is provided with its coils having their greatest cross sectional dimensions at an intermediate portion thereof and the spring is progressively reduced in radial cross sectional dimensions proceeding from the intermediate portion thereof to each of its ends. Thus, in this preferred embodiment, spring 36' has its greatest cross sectional dimensions at the place of greatest stress and it progressively diminishes in cross sectional dimensions in proportion to reduction in stress.

My invention has been built and thoroughly tested and found to be completely satisfactory for the accompishment of the objectives set forth; and, while I have shown and described a preferred commercial embodiment and one modification of my improved helical spring friction clutch and control therefor, it will be understood that the same is capable of further modification and/or substitutions within the spirit and scope of the invention, as defined in the claims.

What I claim is:

1. In a helical spring friction clutch, cooperating driving and driven rotary shaft elements having cylindrical external wall surfaces, means journalling said shaft elements in axial alignment, a helical clutch-acting spring encompassing the external wall surfaces of both shaft elements, said spring having the convolutions of an intermediate portion thereof disposed to overlie the dividing line between said driving and driven shaft elements and formed of greater radial cross sectional dimensions than the convolutions of the end portions of the spring on opposite sides of said intermediate portion, said spring having a driving position wherein it grips the underlying external surfaces of both shaft elements to effect driving engagement therebetween and having a released non-driving position wherein one of the shaft elements is freely rotatable with respect thereto, said spring being normally disposed at and biased to one of said positions, and means for radially moving the spring from said one position to its other position.

2. In a helical spring friction clutch, cooperating driving and driven rotary shaft elements having cylindrical external wall surfaces, means journalling said shaft elements in axial alignment, a helical clutch-acting spring encompassing the external wall surfaces of the shaft elements and anchored to one thereof for common rotation therewith, said spring having the convolutions of the end portion thereof which overlies the wall surface of the other of said shaft elements formed of radially reduced cross sectional dimensions, and means for moving a portion of one of said reduced convolutions radially outwardly whereby to cause the remaining portions of said convolution and adjacent convolutions to contract radially against and grip the underlying external surface of said other shaft element.

3. In a helical spring friction clutch, cooperating driving and driven rotary shaft elements having cylindrical external wall surfaces, means journalling said shaft elements in axial alignment, a helical clutch-acting spring encompassing the external wall surfaces of the shaft elements and anchored to one thereof for common rotation therewith, said spring having the convolutions of the intermediate portion thereof disposed to overlie the dividing line between said driving and driven shaft elements and formed of greater radial cross sectional dimensions than the convolutions of the end portions of the spring on opposite sides of said intermediate portion, and means for moving a portion of a convolution of the end portion of said spring encompassing the wall surface of the other of said shaft elements radially outwardly whereby to cause the remaining portions of said convolution and adjacent convolutions to contract radially against and grip the underlying external surface of said other shaft element.

4. The structure defined in claim 3 in which the convolutions of said end portions are progressively reduced in radial cross sectional dimensions proceeding from the intermediate portion of said spring to each of its ends.

5. In a helical spring friction clutch, cooperating driving and driven rotary shaft elements having cylindrical external wall surfaces, means journalling said shaft elements in axial alignment, a helical clutch-acting spring encompassing the external wall surfaces of the shaft elements and anchored to one thereof for common rotation therewith, said spring having the convolutions of the intermediate portion thereof which overlies adjacent end portions of said surfaces of the shaft elements formed of greater radial cross sectional dimensions than the convolutions of the end portion of the spring encompassing the other of said shaft elements, said other shaft element having an axially extended passage and a radially extending passage communicating with the axially extended passage, a movable member in said radial passage, and an actuator axially movable in said axially extended passage in one direction to engage and move said movable member in a radially outward direction against a portion of one of the convolutions of said reduced end portion of the spring whereby to move said portion radially outwardly and cause the remaining portions of said convolution and adjacent convolutions to contract radially against and grip the underlying external surface of said other shaft element.

6. In a helical spring friction clutch, cooperating driving and driven rotary shaft elements having cylindrical external wall surfaces, means journalling said shaft elements in axial alignment, a helical clutch-acting spring encompassing the external wall surfaces of the shaft elements and anchored to one thereof for common rotation therewith, the other of said shafts having an axially extended passage and a radially extended passage communicating with the axially extended passage, said spring having the convolutions of an intermediate portion thereof which overlies adjacent end portions of said surfaces of the shaft elements formed of greater radial cross sectional dimensions than the convolutions of the end portions of the spring on opposite sides of the intermediate portion thereof whereby to provide more strength in the spring at and close to the dividing line between the shaft elements where the maximum stresses are applied, a movable member in said radial passage, and an actuator axially movable in said axially extended passage in one direction to engage and move said movable member in a radially outward direction against a portion of the spring encompassing said other shaft element whereby to move said portion radially outwardly and cause the remaining portions of said convolution and adjacent convolutions to contract radially against and grip the underlying external surface of said other shaft element.

7. The structure defined in claim 6 in which the convolutions of said end portions are progressively reduced in radial cross sectional dimensions proceeding from the intermediate portion of said spring to each of its ends.

References Cited in the file of this patent

UNITED STATES PATENTS

| | | |
|---|---|---|
| 1,909,420 | Palmgren | May 16, 1933 |
| 2,705,065 | Kloss | Mar. 29, 1955 |